United States Patent
Hussain et al.

(10) Patent No.: US 10,154,369 B2
(45) Date of Patent: Dec. 11, 2018

(54) DETERRENCE OF USER EQUIPMENT DEVICE LOCATION TRACKING

(71) Applicant: HEWLETT PACKARD ENTERPRISE DEVELOPMENT LP, Houston, TX (US)

(72) Inventors: Syed Rafiul Hussain, Palo Alto, CA (US); Shruti Sanadhya, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/369,508

(22) Filed: Dec. 5, 2016

(65) Prior Publication Data
US 2018/0160258 A1   Jun. 7, 2018

(51) Int. Cl.
*H04W 4/02* (2018.01)
*H04W 12/02* (2009.01)

(52) U.S. Cl.
CPC ............. *H04W 4/02* (2013.01); *H04W 12/02* (2013.01)

(58) Field of Classification Search
CPC ....... H04W 4/02; H04W 68/02; H04W 68/00; H04W 12/00
See application file for complete search history.

(56) References Cited

U.S. PATENT DOCUMENTS

| 8,711,791 | B2 | 4/2014 | Wang et al. |
| 9,386,035 | B2 | 7/2016 | Baliga et al. |
| 2014/0181930 | A1 | 6/2014 | Yang |
| 2016/0262015 | A1* | 9/2016 | Lee .................... H04L 61/6054 |
| 2016/0277926 | A1 | 9/2016 | Molina et al. |
| 2017/0135010 | A1* | 5/2017 | Iwai .................... H04W 36/12 |
| 2017/0318452 | A1* | 11/2017 | Hahn .................... H04W 8/20 |

FOREIGN PATENT DOCUMENTS

KR   101625037   5/2016

OTHER PUBLICATIONS

Altaf Shaik, "Practical Attacks Against Privacy and Availability in 4G/LTE Mobile Communication Systems," 16 pps, NDSS '16, Feb. 21-24, 2016, Copyright 2016 Internet Society, ISBN 1-891562-41-X.

(Continued)

*Primary Examiner* — Marisol Figueroa
(74) *Attorney, Agent, or Firm* — Hewlett Packard Enterprise Patent Department

(57) ABSTRACT

Examples include deterrence of user equipment (UE) device location tracking. Some examples include a core network device of a telecommunication network having a processing resource and a machine-readable storage medium with instructions executable by the processing resource to receive a first service request message from the UE device that includes a pseudo-Globally Unique Temporary Identifier (p-GUTI), to send a paging message that includes the p-GUTI, and to receive a second service request message from the UE device that includes a new p-GUTI based on the p-GUTI of the first service request message matching the p-GUTI of the paging message.

20 Claims, 10 Drawing Sheets

(56) References Cited

OTHER PUBLICATIONS

Denis Foo Kune, "Location Leaks on the GSM Air Interface," 13 pps. University of Minnesota, Network and Distributed System Security Symposium 2012.
Ekene, O.E. et al.; "Enhanced User Security and Privacy Protection in 4G LTE Network"; Aug. 25, 2016; 6 pages.
Fabian Van Den Broek, "Defeating IMSI Catchers," CCS'15, Oct. 12-16, 2015, 12 pp, ACM 978-1-4503-3832—May 15, 2010, DOI: http://dx.doi.org/10.1145/2810103.2813615.
Uijin Jang; "Privacy-enhancing Security Protocol in LTE Initial Attack": Dec. 12, 2014: 15 pages.
Myrto Arapinis, "New Privacy Issues in Mobile Telephony: Fix and Verification," 12 pps., CCS'12, Oct. 16-18, 2012, Raleigh, North Carolina, http://www.isti tu-berlin de/fileadmin/fg214/Papers/UMTSprivacy.pdf.
Myrto Arapinis, "Privacy through Pseudonymity in Mobiie Telephony Systems," 14 pps, NDSS '14, Feb. 23-26, 2014, Copyright 2014 Internet Society, ISBN 1-891562-35-5, http://dx doi.org/10 14722/nds 2014 23082.
Ulrike Meyer et al, A Man-in-the-Middle Attack on UMTS, In Proceedings of the 3rd ACM workshop on Wireless security (WiSe '04). ACM, New York, NY, USA, 90-97, DOI=http://dx.doi.org/10.1145/1023662, 2004, 8 Pgs.

\* cited by examiner

DETERRENCE OF USER EQUIPMENT DEVICE LOCATION TRACKING

BACKGROUND

Mobile virtual network operators (MVNOs) provide subscribers access to the cellular service spectrum of multiple mobile network operators (MNOs) by leasing the spectrum from the MNOs and reselling it to subscribers. Because MVNO subscribers have access to the spectrum of multiple MNOs, they may have greater access to cellular coverage and better connectivity. The enhanced connectivity, however, may involve more signaling traffic as a subscriber's user equipment (UE) device negotiates between different MNO's cellular spectrums, potentially offering greater exposure of sensitive information. The increased traffic and repeated exposure of information may make UE devices more susceptible to attack by bad actors.

BRIEF DESCRIPTION OF THE DRAWINGS

The following detailed description references the drawings, wherein.

DETAILED DESCRIPTION

Figure 1:
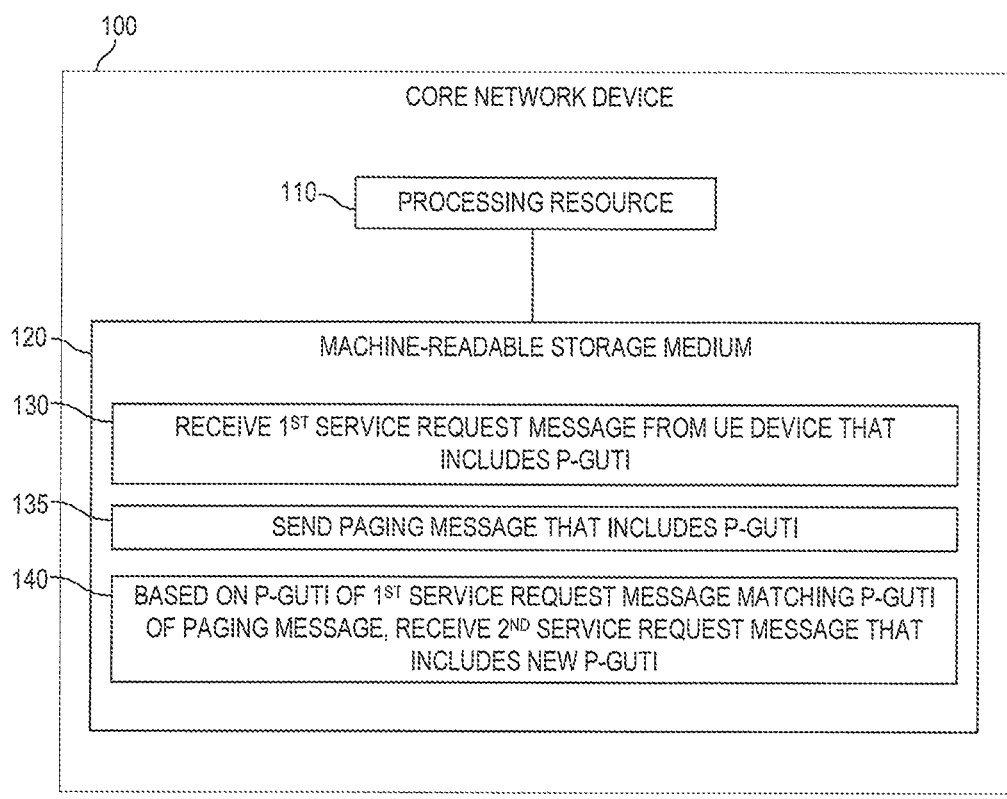
FIG. 1 is a block diagram of an example core network device to deter location tracking of a user equipment (UE) device via a pseudo-Globally Unique Temporary Identifier (p-GUTI)

User equipment (UE) devices that utilize a mobile virtual network operator (MVNO) may continuously monitor the signal strength of multiple networks to determine which network to connect to. Depending on the geographic mobility of the user, this may lead to multiple network switches and hand-offs. While a subscriber may perceive this to be a better experience in which the subscriber maintains optimal connectivity and speed, the increased signaling traffic may offer greater exposure of a subscriber's sensitive or personal information. This, in turn, may make the subscriber more susceptible to attacks. For instance, the increased signaling traffic may allow attackers to isolate and locate individual UE devices.

In some examples, paging procedures used to locate a UE device in a particular area may expose a UE identifier such as a Globally Unique Temporary Identity (GUTI). In other examples, attach procedures used to set up a connection between the UE device and a network may be conducted in clear text, exposing sensitive information to eavesdroppers. Some messages sent during the paging and/or attach procedures may be encrypted to deter attacks. Likewise, some portion of the messages, for instance, sensitive identifying information, may be encrypted to deter attacks. However, encryption may be complex to initiate and establish, particularly during an initial attach procedure. Moreover, in some instances, encryption may be time-consuming, thus affecting a subscriber's overall perception of performance.

Examples described herein may deter location tracking of a UE device. In some examples described herein, a different pseudo-Globally Unique Temporary Identity (p-GUTI) may be used in each paging message to obscure a UE's identity, making it more difficult to isolate a single UE device. In some such examples described herein, an attach request message and a security mode command message may include a nonce to deter replay attacks that may allow a UE device to be located and/or tracked. In other such examples described herein, an attach request message and/or a tracking area update message may be integrity protected to avoid impersonation of the UE device by another.

In some examples described herein, a core network device of a telecommunication network comprises a processing resource and a machine-readable storage medium encoded with instructions executable by the processing resource. The machine-readable storage medium may comprise instructions to receive a first service request message from the UE device, wherein the first service request message includes a p-GUTI to deter location tracking of the UE device and instructions to send a paging message, wherein the paging message includes the p-GUTI. The machine-readable storage medium may also comprise instructions to receive a second service request message from the UE device, wherein the second service request message includes a new p-GUTI, based on the p-GUTI of the first service request message matching the p-GUTI of the paging message.

In some such examples described herein, the machine-readable storage medium may further comprise instructions to receive an attach request message from the UE device, wherein the attach request message includes a nonce and instructions to send a security mode command message to the UE device, wherein the security mode command message includes the nonce. The machine-readable storage medium may additionally comprise instructions to receive a security mode complete message from the UE device based on the nonce of the attach request message matching the nonce of the security mode command message.

In other such examples described herein, the machine-readable storage medium may further comprise instructions to receive an attach request message from the UE device, wherein the attach request message is integrity protected. In some examples, the machine-readable storage medium may also comprise instructions to determine the integrity of the attach request message and to send an attach accept message or an attach reject message to the UE device based on a determination that the integrity of the attach request message is either intact or compromised. In other examples, the machine-readable storage medium may also comprise instructions to receive a tracking area update message, wherein the tracking area update message is integrity protected.

In some examples described herein, a UE device may comprise a processing resource and a machine-readable storage medium encoded with instructions executable by the processing resource. The machine-readable storage medium may comprise instructions to send a first service request message to a core network device, wherein the first service request message includes a p-GUTI to deter location tracking of the UE device. The machine-readable storage medium may also comprise instructions to receive a paging message, wherein the paging message includes the p-GUTI, and to determine whether the p-GUTI of the first service request message matches the p-GUTI of the paging message. In addition, the machine-readable storage medium may comprise instructions to send a second service request message to the core network device, wherein the second service request message includes a new p-GUTI, based on a determination that the p-GUTI of the first service request message matches the p-GUTI of the paging message.

In some examples, a method of deterring location tracking of a UE device is described herein. A first service request message may be received at a core network device from the UE device, wherein the first service request message includes a p-GUTI to deter location tracking of the UE device. The core network device may send a paging message, wherein the paging message includes the p-GUTI. Based on the p-GUTI of the first service request message matching the p-GUTI of the paging message, the core network device may receive a second service request message from the UE device, wherein the second service request message includes a new p-GUTI and wherein each subsequent service request message includes a different p-GUTI. In examples described herein, a determination, action, etc., that is said to be "based on" a given condition may be based on that condition alone or based on that condition and other condition(s).

Referring now to the drawings, FIG. 1 is a block diagram of an example core network device 100 of a telecommunication network to deter location tracking of a user equipment (UE) device. A telecommunication network, as used herein, is a collection of nodes that are interconnected via transmission links to enable telecommunication between the nodes. In some examples, a telecommunication network may comprise a telephone network such as a cellular and/or a public switched telephone network, an access network, a computer network, the internet, and the like.

A core network device, as used herein, may refer to a network element that is part of a telecommunication network and provides a service to a subscriber. In one example involving a Long Term Evolution (LTE) telecommunication network, core network device 100 may be mobility management entity (MME). In other examples involving wireless networks (e.g., WiFi), the Universal Mobile Telecommunications System (UMTS) network, or other such networks, core network device 100 may be a device similar to an MME and that implements functionalities similar to that of the MME of the LTE network.

A user equipment (UE) device, as used herein, may refer to any device used directly by an end-user or subscriber to communicate in the telecommunication network. In some examples, the UE device may be a mobile phone, smart device, tablet computer, desktop computer, laptop (or notebook) computer, workstation, or the like.

A UE device may communicate with a core network device within a telecommunication network to receive services. In an LTE network architecture, the UE and core network device may communicate via an access network such as the Evolved Universal Terrestrial Radio Access Network (E-UTRAN) made up of access network devices like Evolved Node Bs (eNodeB). The eNodeBs may interface between the UE and the core network device to facilitate communication. In some examples described herein, a message to or from a UE device to a core network device and vice versa may pass through an eNodeB or may first arrive at an eNodeB to be re-packaged for the UE device or core network device. In telecommunication networks other than LTE, the UE device and core network device may communicate via a different access network element or device.

Figure 10:
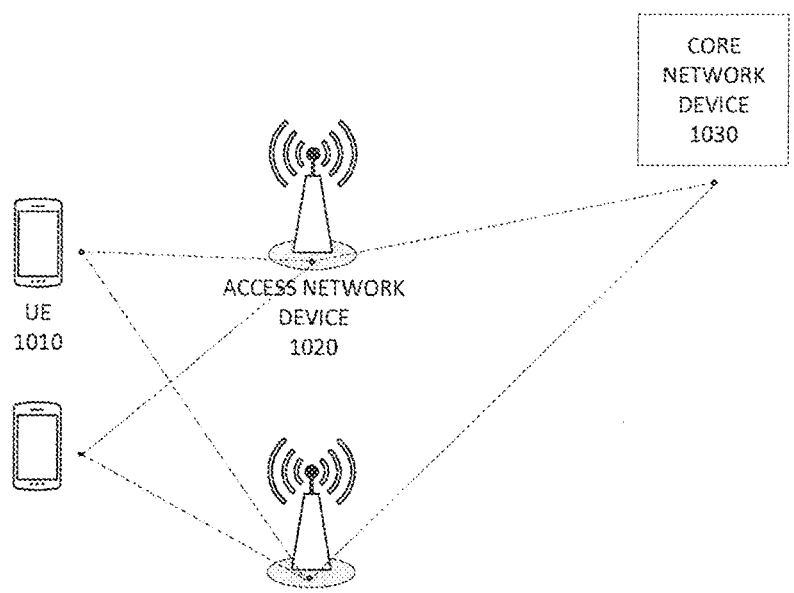
FIG. 10 is an example environment including an example UE device and an example core network device.

FIG. 10 depicts an example environment in which an example UE device, as described herein, may communicate with an example core network device via an access network device. As shown, UE devices 1010 interface with core network device 1030 via access network devices 1020. Although UE device 1010 is depicted as a smart phone, UE device 1010 may be any suitable UE device.

Returning to FIG. 1, as shown, core network device 100 comprises a processing resource 110 and a machine-readable storage medium 120 comprising (e.g., encoded with) instructions 130, 135, and 140 executable by processing resource 110 to implement functionalities described herein in relation to FIG. 1. Core network device 100 includes processing resource 110 and machine-readable storage medium 120 to deter location tracking of a UE device. The functionalities described herein in relation to instructions 130, 135, 140, and any additional instructions described herein in relation to storage medium 120, are implemented at least in part in electronic circuitry (e.g., via any combination of hardware and programming to implement functionalities, as described below).

In examples described herein, a processing resource may include, for example, one processor or multiple processors included in a single computing device or distributed across multiple devices. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

Processing resource 110 may fetch, decode, and execute instructions stored on storage medium 120 to perform the functionalities described below in relation to instructions 130, 135, and 140. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In the example of FIG. 1, instructions 130 receive a first service request message from the UE device. A service request message, as used herein, refers to a message from a UE device to a core network device to request establishment of a connection. In an LTE network, for instance, a service request message may be sent in a variety of scenarios. In one example, the UE may send a service request message when it is registered to a particular network, but has been idle for a certain period of time, and has pending user data to be sent to the network. In another example, a service request message may be sent in response to a paging message from the core network device. The first service request message may be encrypted in some examples.

Instructions 130 receive the first service request message, wherein the first service request message includes a pseudo-Globally Unique Temporary Identifier (p-GUTI). A Globally Unique Temporary Identity (GUTI), as used herein, is a temporary UE identifier. In the examples described herein, a p-GUTI refers to a replacement or substitute for a temporary UE identifier that acts as a shared secret between the UE device and the core network device. In an LTE telecommunication network, the GUTI may act as a temporary identifier that is a combination of a Globally Unique MME identity (GUMMEI) and an MME Temporary Mobile Subscriber Identity (M-TMSI). The GUTI may be allocated to a UE device to prevent exposure of a UE device's International Mobile Subscriber Identity (IMSI). In such an example, the p-GUTI is an identifier that is used in place of or as a substitute for the GUTI. In a non-LTE telecommunication network, the p-GUTI may be used in place of a different temporary UE identifier with a function similar to that of the GUTI in the LTE network. For instance, in a WiFi network, the p-GUTI may be used in place of an IP address that is being used as a temporary UE identifier. In a UMTS network, the p-GUTI may be used in place of a packet-temporary mobile subscriber identity (P-TMSI). In some examples, upon receiving the p-GUTI, core network device 100 may associate the p-GUTI with a particular UE device and store the p-GUTI for later use.

Instructions 135 send a paging message that includes the p-GUTI. A paging message, as used herein, refers to a message from a core network device to locate a UE device. The p-GUTI replaces a GUTI or other UE identifier that would otherwise be sent with the paging message. In some examples, core network device 100 may send a paging message to a network element in an access network to locate the UE device. For instance, in an LTE network, core network device 100 may send a paging message to a set of eNodeBs, which may, in turn, forward the paging message to a set of UE devices to locate a particular UE device. Similarly, in a UMTS network, core network device 100 may send the paging message to a radio network controller (RNC) which may, in turn, forward the paging message to a set of UE devices to locate a particular UE device. In some examples, the paging message may be sent in clear text. In other examples, the p-GUTI of the paging message may be encrypted.

Instructions 140 receive a second service request message from the UE device that includes a new p-GUTI based (at least in part) on the p-GUTI of the first service request message matching the p-GUTI of the paging message. The second service request message may be encrypted in some examples. The UE device may confirm that the p-GUTI of the paging message matches the p-GUTI of the most recently sent service request message, i.e., the first service request message. If the p-GUTIs do not match, in some examples, the UE device will not respond, assuming the paging message to be directed at another UE device.

The inclusion of a p-GUTI in a paging message may deter location tracking attacks that rely on the paging message. In some telecommunication networks, paging messages may include a temporary UE identifier (i.e., a GUTI) that is sent in clear text. If the GUTI is changed infrequently, attackers may map the GUTI to the UE device, allowing tracking of the UE device. In a scenario where an IMSI, phone number, social networking ID, or other user ID is known to an attacker, the attacker may be able to identify and map a GUTI to the known identifier, allowing the attacker to verify and track the presence of the UE device associated with those identifiers.

As an example, an attacker that knows a victim's phone number may make a phone call to the victim's UE device, allow enough time for a core network device to send a paging message intended for the victim's UE device, and disconnect the call before it is established. The attacker may then sniff a paging channel for the paging message. If the paging message includes a single GUTI, the attacker can uniquely map the phone number to the GUTI, verifying the victim's presence and allowing for location tracking until the GUTI is changed. If the paging message includes multiple GUTIs, an attacker may iteratively make phone calls to the victim's UE device and sniff the resulting paging messages until the GUTI can be computed from the intersection of the GUTIs within the paging messages. By utilizing a p-GUTI that changes with each paging message, an attacker may be unable to verify the presence of the UE device within a certain tracking area via paging messages.

Instructions 130, 135, and 140 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 130, 135, and 140 may be part of an application, applications, or component(s) already installed on core network device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-10.

Figure 2:
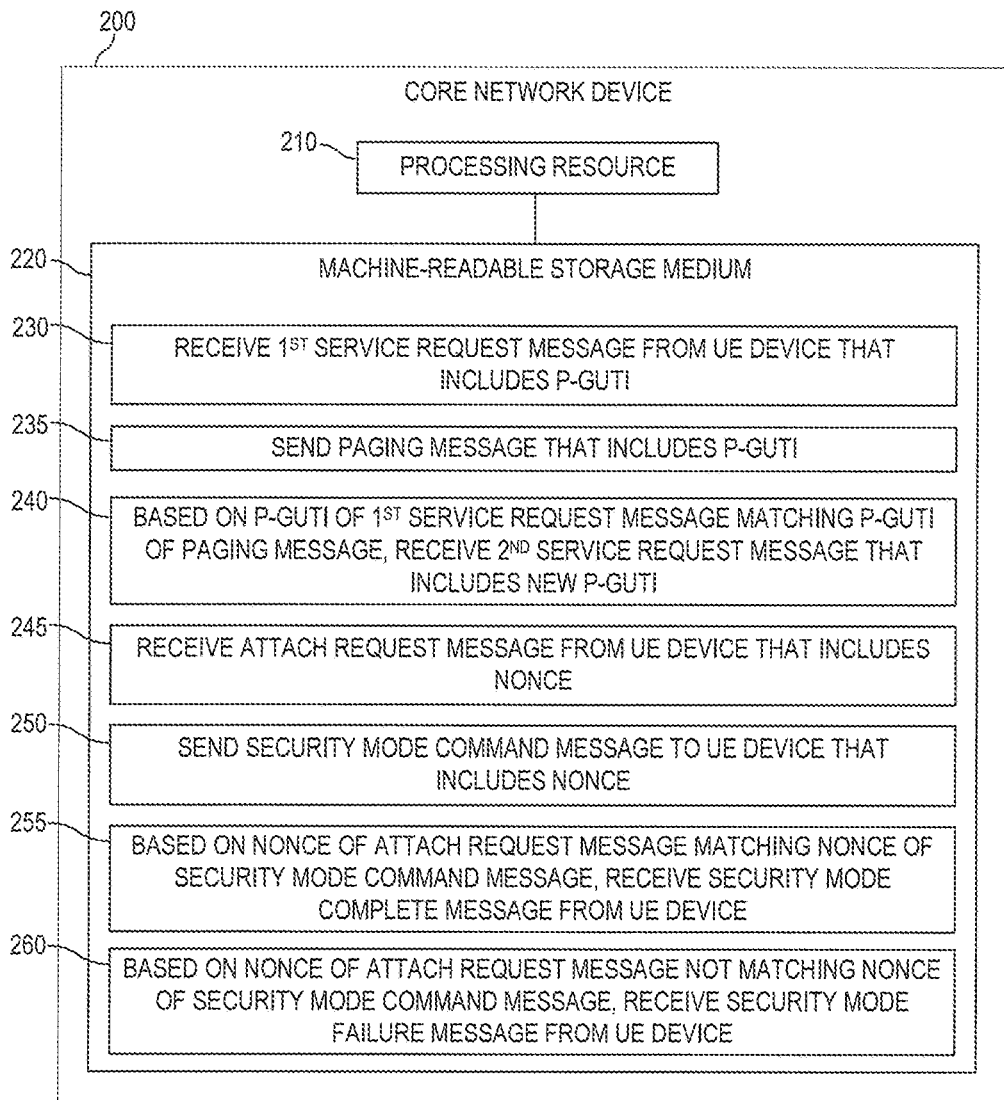
FIG. 2 is a block diagram of an example core network device to deter location tracking of a UE device via a p-GUTI and a nonce.

Further examples are described with reference to FIG. 2. FIG. 2 is a block diagram of an example core network device 200 of a telecommunication network to deter location tracking of a UE device that comprises a processing resource 210 and a machine-readable storage medium 220. The machine-readable storage medium 210 comprises (e.g., encoded with) instructions 230, 235, 240, 245, 250, 255, and 260 executable by processing resource 210 to implement functionalities described herein in relation to FIG. 2. The functionalities described herein in relation to instructions 230, 235, 240, 245, 250, 255, 260, and any additional instructions described herein in relation to storage medium 220, are implemented at least in part in electronic circuitry (e.g., via any combination of hardware and programming to implement functionalities, as described below).

Instructions 230 receive a first service request message that includes a p-GUTI from the UE device, as described above in relation to instructions 130 of FIG. 1. Instructions 235 send a paging message that includes the p-GUTI, as described above in relation to instructions 135 of FIG. 1. Instructions 240 receive a second service request message from the UE device that includes a new p-GUTI based (at least in part) on the p-GUTI of the first service request message matching the p-GUTI of the paging message, as described above in relation to instructions 140 of FIG. 1.

Instructions 245 of FIG. 2 receive an attach request message from the UE device that includes a nonce. The attach request message may, in some examples, be received via an eNodeB. In the examples described herein, an attach request message refers to a request message from a UE device to attach to a network. A nonce, as used herein, is a number used once. Use of a nonce may deter replay attacks in which messages are resent to glean information. For instance, a second attach request message from the same UE device utilizing the same nonce would be recognized to be invalid. Such a request may be treated differently from a valid attach request message and/or flagged as suspicious. In some examples, a first nonce may be stored on a subscriber identification module (SIM) card of a UE device.

Instructions 250 send a security mode command message to the UE device that includes the nonce. As used herein, the security mode command message is a message to the UE device that initiates security procedures between the UE device and a core network device. In some examples, the security mode command message may include encryption and integrity protection algorithms. The nonce may also be used with a cryptographic hash of the security mode command message. The security mode command message may also be sent to the UE device via an eNodeB, in some examples.

Instructions 255 may receive a security mode complete message from the UE device based (at least in part) on the nonce of the attach request message matching the nonce of the security mode command message. A security mode complete message, as used herein, may refer to a message from the UE device that indicates the successful completion of the security procedures initiated by the security mode command message. The security mode complete message may be encrypted and integrity protected according to the algorithms sent in a security mode command message to the UE device. The UE device may confirm that the nonce of the attach request message matches the nonce of the security mode command message before sending a security mode complete message. Core network device 200 may receive the security mode complete message from the UE device via an eNodeB, in some instances.

In some examples, instructions 260 may receive a security mode failure message from the UE device based (at least in part) on the nonce of the attach request message not matching the nonce of the security mode command message. A security mode failure message, as used herein, may refer to a message from the UE device that indicates failure of the security procedures initiated in the security mode command message. In some examples, if the UE device determines that the nonce of the attach request message does not match the nonce of the security mode command message, it may assume the security mode command message to be malicious and suspend the initiation of the security procedures as well as any attach procedures. Core network device 200 may receive the security mode failure message from the UE device via an eNodeB, in some instances.

The use of a nonce in an attach request message and a security mode command message helps deter replay attacks using security mode command messages that may allow a UE device's location to be tracked. As an example, an attacker may replay a security mode command message that does not have a nonce to a set of UE devices. Because the security mode command message does not include a nonce, the UE device is unable to detect the replay attack. Upon receiving the security mode command message, a victim UE device may send a security mode complete message, which the attacker may sniff to verify that the UE device is in a particular tracking area. Use of a nonce in an attach request message and a security mode command message may thwart the usage of security mode command messages to track a UE device's location.

Instructions 230, 235, 240, 245, 250, 255 and 260 may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 230, 235, 240, 245, 250, 255 and 260 may be part of an application, applications, or component(s) already installed on core network device 200 including processing resource 210. In such examples, the storage medium 220 may include memory such as a hard drive, solid state drive, or the like. In some examples, functionalities described herein in relation to FIG. 2 may be provided in combination with functionalities described herein in relation to any of FIGS. 1 and 3-10.

Figure 3:
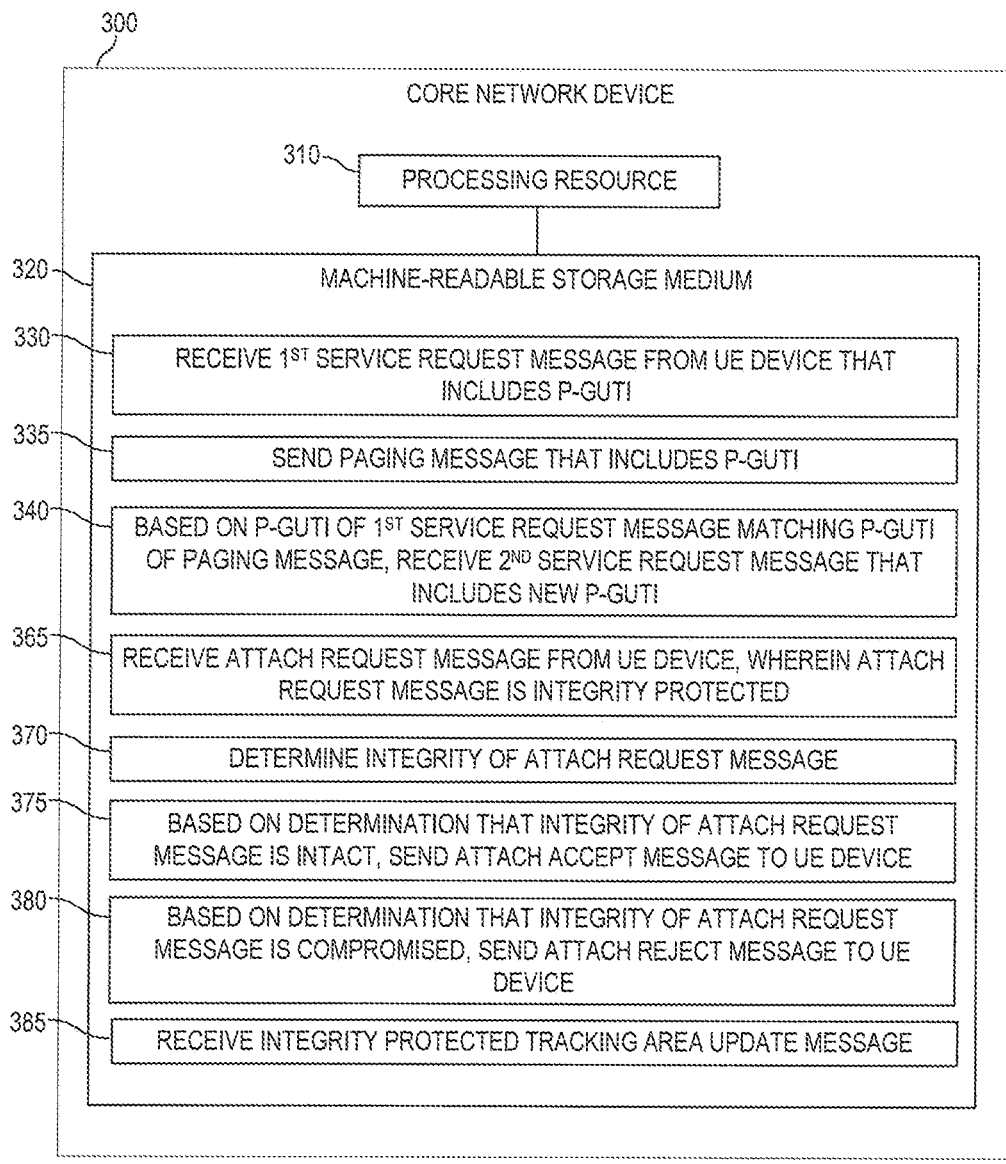
FIG. 3 is a block diagram of an example core network device to deter location tracking of a UE device via a p-GUTI and integrity protection.

Further examples are described with reference to FIG. 3. FIG. 3 is a block diagram of an example core network device 300 of a telecommunication network to deter location tracking of a UE device that comprises a processing resource 310 and a machine-readable storage medium 320. The machine-readable storage medium 310 comprises (e.g., encoded with) instructions 330, 335, 340, 365, 370, 375, 380, and 385 executable by processing resource 310 to implement functionalities described herein in relation to FIG. 3. The functionalities described herein in relation to instructions 330, 335, 340, 365, 370, 375, 380, 385, and any additional instructions described herein in relation to storage medium 320, are implemented at least in part in electronic circuitry (e.g., via any combination of hardware and programming to implement functionalities, as described below).

Instructions 330 receive a first service request message that includes a p-GUTI from the UE device, as described above in relation to instructions 130 of FIG. 1. Instructions 335 send a paging message that includes the p-GUTI, as described above in relation to instructions 135 of FIG. 1. Instructions 340 receive a second service request message from the UE device that includes a new p-GUTI based (at least in part) on the p-GUTI of the first service request message matching the p-GUTI of the paging message, as described above in relation to instructions 140 of FIG. 1.

Instructions 365 of FIG. 3 receive an attach request message from the UE device that is integrity protected. In some examples, core network device 300 may receive the attach request message from the UE device via an eNodeB. As described above, an attach request message refers to a request message from a UE device to attach to a network. Integrity protection, as used herein, refers to protection that ensures a message has not been altered or tampered with. Integrity protection may involve authentication and/or authenticity. In some examples, the attach request message may be integrity protected via integrity algorithm agreement, integrity key agreement, and the like. An integrity algorithm agreement, as used herein, refers to a process of securely negotiating an integrity algorithm for subsequent use. An integrity key agreement, as used herein, refers to a process of agreeing on an integrity key for subsequent use. In some examples, the attach request message may be integrity protected via Diffie-Hellman key exchange or any public key cryptography.

Instructions 370 determine the integrity of the attach request message. For instance, if the attach request message is integrity protected via integrity algorithm agreement and integrity key agreement, core network device 300 may determine whether the agreed-upon integrity algorithm and integrity key were used and confirm that the attach request message is in its original form and was not altered or tampered with.

As shown in FIG. 3, instructions 375 send an attach accept message to the UE device based (at least in part) on a determination that the integrity of the attach request message is intact. An attach accept message, as used herein, may refer to a message to the UE device that indicates acceptance of the corresponding attach request message. The attach accept message may be sent after a determination that the attach request message was sent using an agreed-upon integrity algorithm and integrity key and has not been altered or tampered with. In some examples, core network device 300 may send the attach accept message to the UE device via an eNodeB.

Instructions 380 send an attach reject message to the UE device based (at least in part) on a determination that the integrity of the attach request message is compromised. An attach reject message, as used herein, may refer to a message to the UE device that indicates the corresponding attach request message has not been accepted. The attach reject message may be sent after a determination that the attach request message was not sent using the agreed-upon integrity algorithm and integrity key and/or a determination that the attach request message was altered or tampered with. In some examples, core network device 300 may send the attach reject message to the UE device via an eNodeB.

In some examples, such as the example of FIG. 3, a tracking area update message may be received that is integrity protected. A tracking area update message may refer to a message sent by a UE device to inform a network of its location (i.e., tracking area). In some examples, the tracking area update message may be sent periodically, may be sent when the UE device enters a new tracking area or previously unregistered tracking area, may be sent to update certain UE-specific parameters in the network, and the like. The tracking area update message may be integrity protected via integrity algorithm agreement, integrity key agreement, and the like.

Integrity protecting the attach request and tracking area update messages may further deter location tracking attacks of UE devices. In some telecommunication networks, attach request messages and tracking area update messages are sent in clear text. Accordingly, in one example, an attacker that knows a victim UE device's IMSI can send an attach request message to the network with a forbidden value, prompting an attach reject message from the network to the victim UE device. Upon receiving the attach reject message, the UE device will disable the current network and attempt to connect to a new network via an attach request message. The attacker may detect subsequent attach request messages with the victim UE device's IMSI, verifying the presence of the UE device within a certain tracking area. Integrity protected attach request messages and tracking area update messages may prevent these types of attacks by allowing messages from malicious UE devices to be differentiated from messages from honest UE devices.

Instructions 330, 335, 340, 365, 370, 375, 380, and 385 may be part of an installation package that, when installed, may be executed by processing resource 310 to implement the functionalities described above. In such examples, storage medium 320 may be a portable medium, such as a CD, DVD, or flash drive, or a memory maintained by a server from which the installation package can be downloaded and installed. In other examples, instructions 330, 335, 340, 365, 370, 375, 380, and 385 may be part of an application, applications, or component(s) already installed on core network device 300 including processing resource 310. In such examples, the storage medium 320 may include memory such as a hard drive, solid state drive, or the like. In some examples, functionalities described herein in relation to FIG. 3 may be provided in combination with functionalities described herein in relation to any of FIGS. 1-2 and 4-10.

Figure 4:
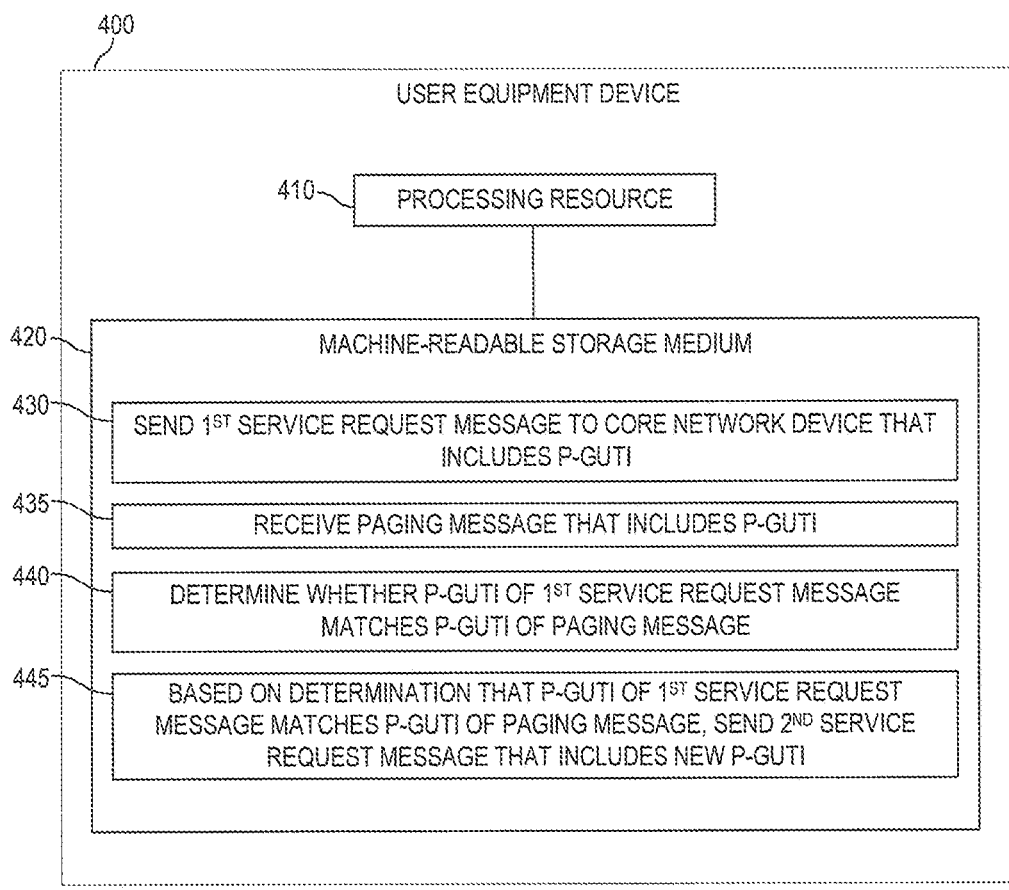
FIG. 4 is a block diagram of an example UE device to deter location tracking via a p-GUTI.
Figure 5:
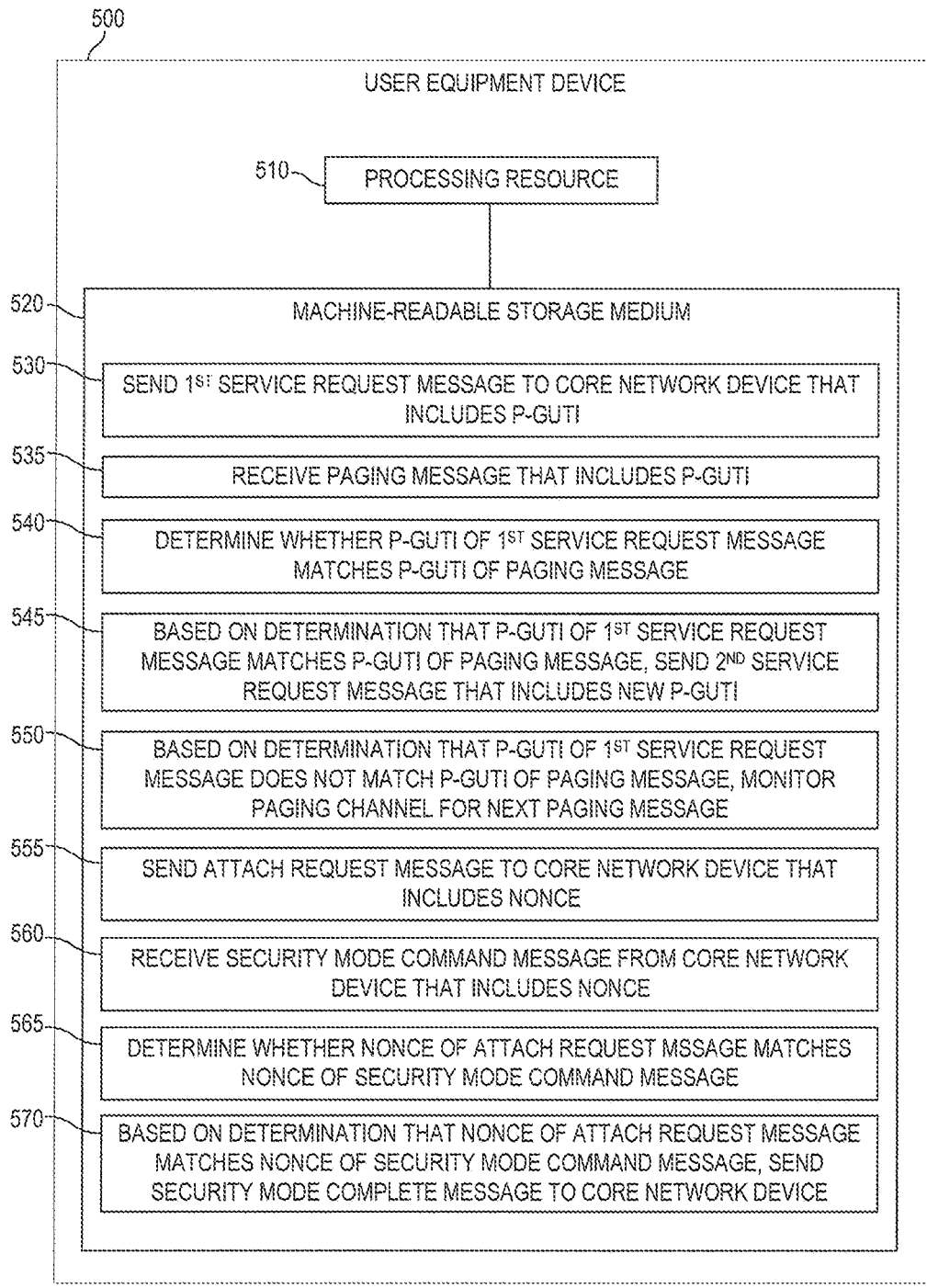
FIG. 5 is a block diagram of an example UE device to deter location tracking via a p-GUTI and a nonce.
Figure 6:
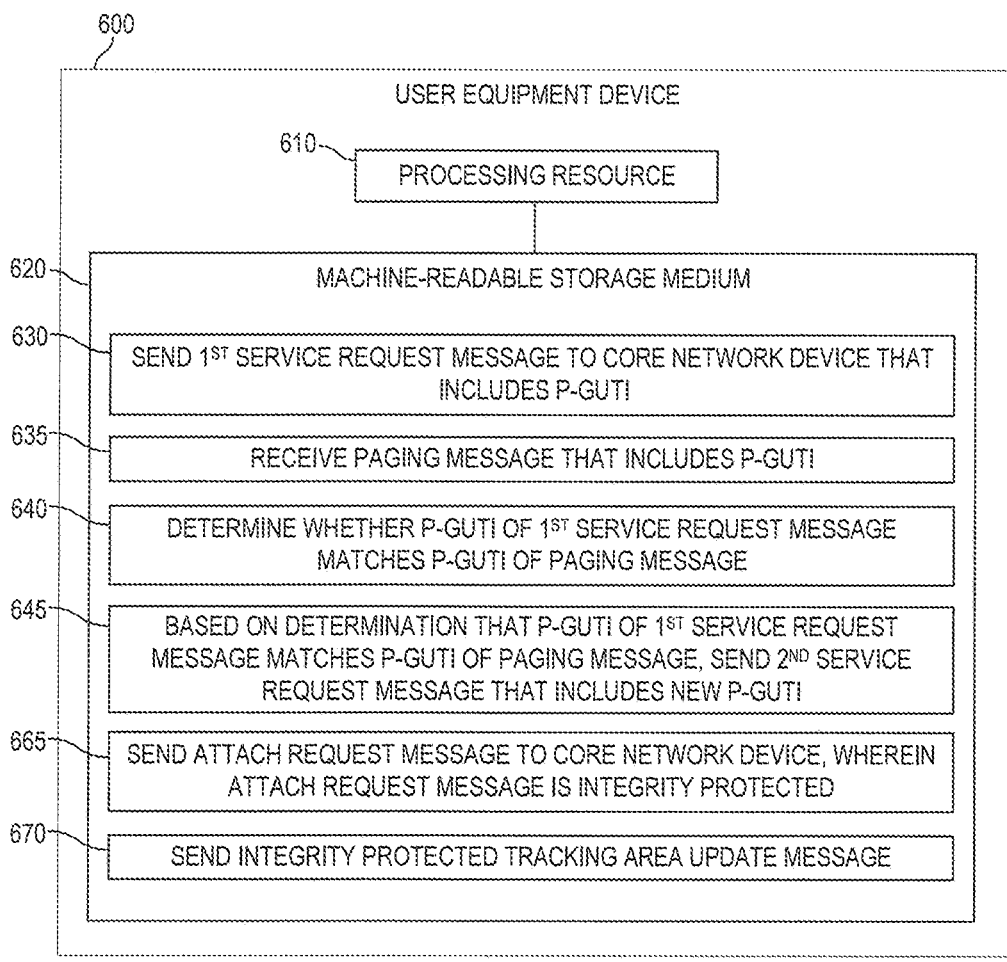
FIG. 6 is a block diagram of an example UE device to deter location tracking via a p-GUTI and integrity protection.

FIGS. 4-6 depict a block diagram of an example UE device of a telecommunication network to deter location tracking of the UE device. As shown in FIG. 4, example UE device 400 comprises a processing resource 410 and a machine-readable storage medium 420. The machine-readable storage medium 410 comprises (e.g., encoded with) instructions 430, 435, 440, and 445 executable by processing resource 410 to implement functionalities described herein in relation to FIG. 4. The functionalities described herein in relation to instructions 430, 435, 440, 445, and any additional instructions described herein in relation to storage medium 420, are implemented at least in part in electronic circuitry (e.g., via any combination of hardware and programming to implement functionalities, as described below).

Instructions 430 send a first service request message to a core network device, wherein the first service request message includes a p-GUTI. The first service request message may be received by the core network device, as described above in relation to instructions 130 of FIG. 1. In some examples, UE device 400 may send the first service request message to the core network device via an eNodeB.

Instructions 435 receive a paging message that includes the p-GUTI. The paging message may be sent by the core network device, as described above in relation to instructions 135 of FIG. 1. In response to receiving the paging message, instructions 440 determine whether the p-GUTI of the first service request message matches the p-GUTI of the paging message. UE device 400 may confirm whether the p-GUTI of the paging message matches the p-GUTI of the most recently sent service request message, i.e., the first service request message, to confirm the authenticity of the paging message.

Instructions 445 of FIG. 4 send a second service request message to the core network device that includes a new p-GUTI based on a determination that the p-GUTI of the first service request message matches the p-GUTI of the paging message. The second service request message may be received by the core network device, as described above in relation to instructions 140 of FIG. 1. As described above in relation to FIG. 1, the use of p-GUTI in paging messages may deter location tracking attacks that rely on paging messages.

Instructions 430, 435, 440, and 445 may be part of an installation package that, when installed, may be executed by processing resource 410 to implement the functionalities described above. In such examples, storage medium 420 may be a portable medium, such as a CD, DVD, or flash drive, or a memory maintained by a server from which the installation package can be downloaded and installed. In other examples, instructions 430, 435, 440, and 445 may be part of an application, applications, or component(s) already installed on core network device 400 including processing resource 410. In such examples, the storage medium 420 may include memory such as a hard drive, solid state drive, or the like. In some examples, functionalities described herein in relation to FIG. 4 may be provided in combination with functionalities described herein in relation to any of FIGS. 1-3 and 5-10.

FIG. 5 depicts an example UE device 500 comprising a processing resource 510 and a machine-readable storage medium 520. The machine-readable storage medium 510 comprises (e.g., encoded with) instructions 530, 535, 540, 545, 550, 555, 560, 565, and 570 executable by processing resource 510 to implement functionalities described herein in relation to FIG. 5. The functionalities described herein in relation to instructions 530, 535, 540, 545, 550, 555, 560, 565, 570, and any additional instructions described herein in relation to storage medium 520, are implemented at least in part in electronic circuitry (e.g., via any combination of hardware and programming to implement functionalities, as described below).

Instructions 530 send a first service request message to a core network device, wherein the first service request message includes a p-GUTI, as described above in relation to instructions 430 of FIG. 4. Instructions 535 receive a paging message that includes the p-GUTI, as described above in relation to instructions 435 of FIG. 4. In response to receiving the paging message, instructions 540 determine whether the p-GUTI of the first service request message matches the p-GUTI of the paging message, as described above in relation to instructions 440 of FIG. 4. Instructions 545 of FIG. 5 send a second service request message to the core network device that includes a new p-GUTI based on a determination that the p-GUTI of the first service request message matches the p-GUTI of the paging message, as described above in relation to instructions 445 of FIG. 4.

Instructions 550 may monitor a paging channel for a next paging message based on a determination that the p-GUTI of the first service request message does not match the p-GUTI of the paging message. In some examples, UE device 500 may monitor the paging channel at periodic paging occasions. As used herein, the paging channel may refer to a transmission link across which a paging message is sent or broadcast.

Instructions 555 of FIG. 5 may send an attach request message to the core network device that includes a nonce. The attach request message may be received by the core network device, as described above in relation to instructions 245 of FIG. 2. In some examples, UE device 500 may send the attach request message to the core network device via an eNodeB. Instructions 560 receive a security mode command message from the core network device that includes the nonce. The security mode command message may be sent by the core network device, as described above in relation to instructions 250 of FIG. 2. In some examples, the core network device may send the security mode command message to UE device 500 via an eNodeB.

In response to receiving the security mode command message, instructions 565 determine whether the nonce of the attach request message matches the nonce of the security mode command message. UE device 500 may confirm whether the nonce of the attach request message matches the nonce of the security mode command message, i.e., the first service request message, to confirm the authenticity of the security mode command message.

Instructions 570 may send a security mode complete message to the core network device based (at least in part) on a determination that the nonce of the attach request message matches the nonce of the security mode command message. The security mode complete message may be received by the core network device, as described above in relation to instructions 255 of FIG. 2. In some examples, based on a determination that the nonces do not match, UE device 500 may send the core network device a security mode failure message (not shown in FIG. 5). This message may be received by the core network device, as described above in relation to instructions 260 of FIG. 2. As described above in relation to FIG. 2, the use of a nonce in attach request and security mode command messages may deter location tracking attacks that replay security mode command messages.

Instructions 530, 535, 540, 545, 550, 555, 560, 565, and 570 may be part of an installation package that, when installed, may be executed by processing resource 510 to implement the functionalities described above. In such examples, storage medium 520 may be a portable medium, such as a CD, DVD, or flash drive, or a memory maintained by a server from which the installation package can be downloaded and installed. In other examples, instructions 530, 535, 540, 545, 550, 555, 560, 565, and 570 may be part of an application, applications, or component(s) already installed on core network device 500 including processing resource 510. In such examples, the storage medium 520 may include memory such as a hard drive, solid state drive, or the like. In some examples, functionalities described herein in relation to FIG. 5 may be provided in combination with functionalities described herein in relation to any of FIGS. 1-4 and 6-10.

FIG. 6 depicts an example UE device 600 comprising a processing resource 610 and a machine-readable storage medium 620. The machine-readable storage medium 610 comprises (e.g., encoded with) instructions 630, 635, 640, 645, 665, and 670 executable by processing resource 610 to implement functionalities described herein in relation to FIG. 6. The functionalities described herein in relation to instructions 630, 635, 640, 645, 665, 670, and any additional instructions described herein in relation to storage medium 620, are implemented at least in part in electronic circuitry (e.g., via any combination of hardware and programming to implement functionalities, as described below).

Instructions 630 send a first service request message to a core network device, wherein the first service request message includes a p-GUTI, as described above in relation to instructions 430 of FIG. 4. Instructions 635 receive a paging message that includes the p-GUTI, as described above in relation to instructions 435 of FIG. 4. In response to receiving the paging message, instructions 640 determine whether the p-GUTI of the first service request message matches the p-GUTI of the paging message, as described above in relation to instructions 440 of FIG. 4. Instructions 645 of FIG. 5 send a second service request message to the core network device that includes a new p-GUTI based on a determination that the p-GUTI of the first service request message matches the p-GUTI of the paging message, as described above in relation to instructions 445 of FIG. 4.

Instructions 665 of FIG. 6 may send an attach request message to the core network device, wherein the attach request message is integrity protected. The attach request message may be received by the core network device, as described above in relation to instructions 365 of FIG. 3. In some examples, UE device 600 may send the attach request message to the core network device via an eNodeB. In some examples, UE device 600 may receive an attach accept message from the core network device based (at least in part) on a determination that the integrity of the attach request message is intact. In other examples, UE device 600 may receive an attach reject message from the core network device based (at least in part) on a determination that the integrity of the attach request message has been compromised.

Instructions 670 may send a tracking area update message to the core network device, wherein the tracking area update message is integrity protected. The tracking area update message may be received by the core network device, as described above in relation to instructions 385 of FIG. 3. As described above in relation to FIG. 3, integrity protecting attach request and tracking area update messages may deter attackers that rely on these messages to detect a victim UE's location.

Instructions 630, 635, 640, 645, 665, and 670 may be part of an installation package that, when installed, may be executed by processing resource 610 to implement the functionalities described above. In such examples, storage medium 620 may be a portable medium, such as a CD, DVD, or flash drive, or a memory maintained by a server from which the installation package can be downloaded and installed. In other examples, instructions 630, 635, 640, 645, 665, and 670 may be part of an application, applications, or component(s) already installed on core network device 600 including processing resource 610. In such examples, the storage medium 620 may include memory such as a hard drive, solid state drive, or the like. In some examples, functionalities described herein in relation to FIG. 6 may be provided in combination with functionalities described herein in relation to any of FIGS. 1-5 and 7-10.

Figure 7:
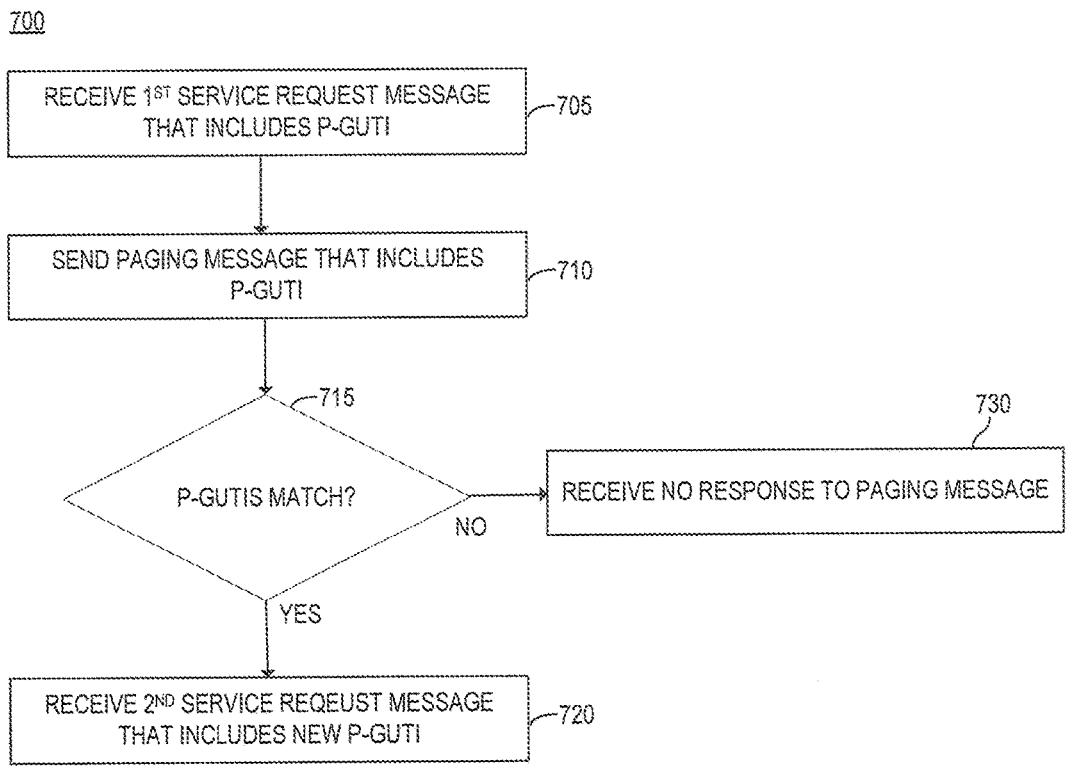
FIG. 7 is a flowchart of an example method of deterring location tracking of a UE device via a p-GUTI.
Figure 8:
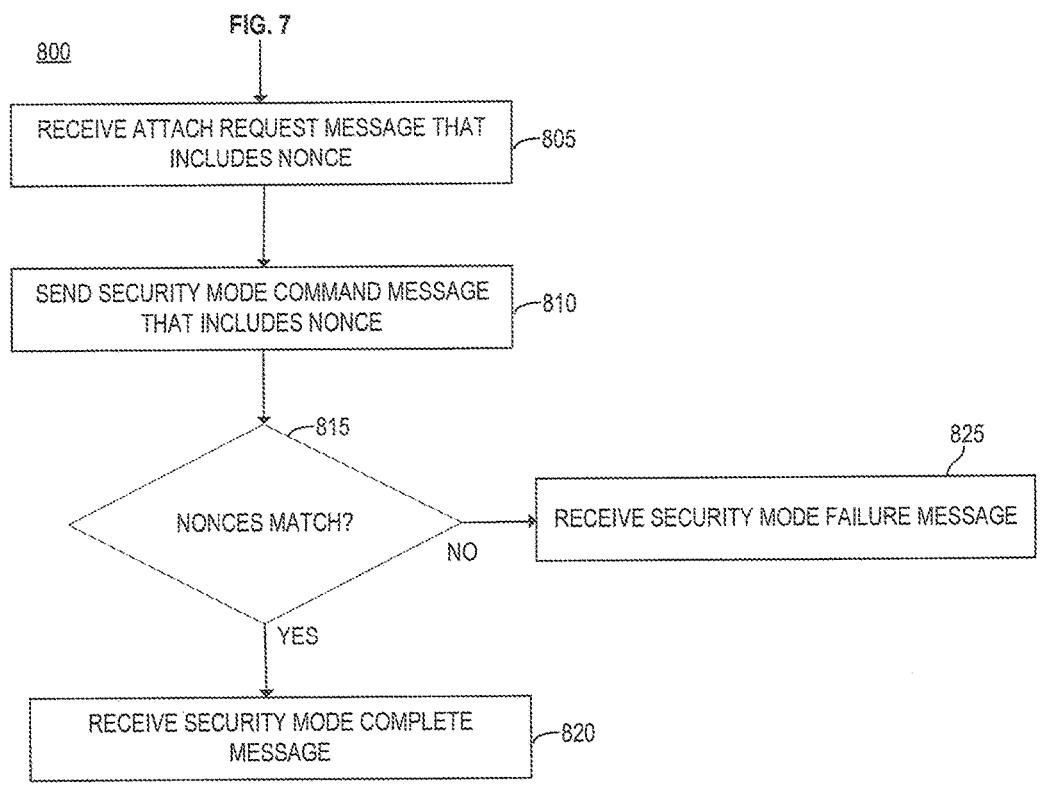
FIG. 8 is a flowchart of an example method of deterring location tracking of a UE device via a nonce.
Figure 9:
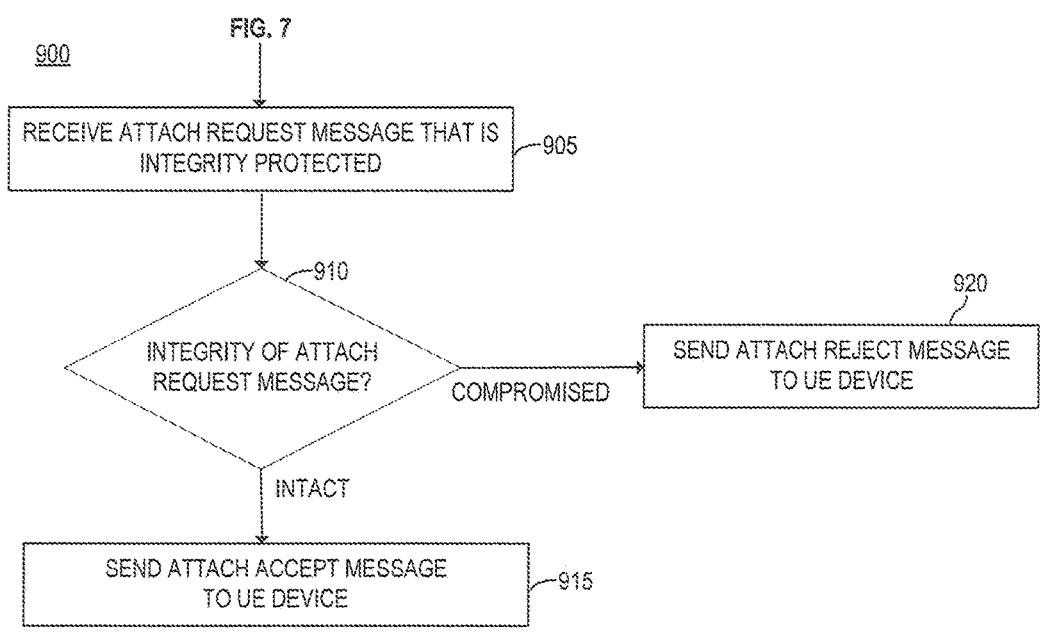
FIG. 9 is a flowchart of an example method of deterring location tracking of a UE device via integrity protection.

Additional examples are described herein in relation to FIGS. 7-9. FIG. 7 is a flowchart of an example method 700 of deterring location tracking of a UE device. Execution of method 700 is described below with reference to core network device 100 of FIG. 1. Implementation of method 700 is not limited to such examples, however (e.g., core network device 200 of FIG. 2, etc.).

In the example of FIG. 7, method 700 may be a method of core network device 100 of FIG. 1. At 705, a first service request message that includes a p-GUTI may be received at core network device 100. This receipt may be performed as described above in relation to instructions 130 of FIG. 1. At 710, a paging message may be sent by core network device 100 that includes the p-GUTI, as described above in relation to instructions 135 of FIG. 1.

At 715, if the p-GUTI of the first service request message matches the p-GUTI of the paging message, method 700 may proceed to 720. At 720, a second service request message that includes a new p-GUTI may be received at core network device 100 based (at least in part) on the p-GUTIs matching, as described above in relation to instructions 140 of FIG. 1. Each subsequent service request message may include a different p-GUTI such that the p-GUTI is changed frequently and cannot be used to track the location of a UE device. If, however, at 715, the p-GUTIs do not match, method 700 may proceed to 730. At 730, core network device 100 will not receive a response to the paging message based (at least in part) on the p-GUTI of the first service request message not matching the p-GUTI of the paging message.

Although the flowchart of FIG. 7 shows a specific order of performance of certain functionalities, method 700 may not be limited to that order. For example, the functionalities shown in succession in the flowchart may be performed in a different order, may be executed concurrently or with partial concurrence, or a combination thereof. In some examples, functionalities described herein in relation to FIG. 7 may be provided in combination with functionalities described herein in relation to any of FIGS. 1-6 and 8-10.

FIG. 8 is a flowchart of an example method 800 of deterring location tracking of a UE device. Execution of method 800 is described below with reference to core network device 200 of FIG. 2. Implementation of method 800 is not limited to such examples, however (e.g., core network device 100 of FIG. 1, etc.).

In the example of FIG. 8, method 800 may be a method of core network device 200 of FIG. 2. Method 800 may follow method 700 of FIG. 7. At 805 core network device 200 may receive an attach request message that includes a nonce, as described above in relation to instructions 245 of FIG. 2. At 810, core network device 200 may send a security mode command message to the UE device that includes the nonce, as described above in relation to instructions 250 of FIG. 2.

At 815, if the nonce of the attach request message matches the nonce of the security mode command message, method 800 may proceed to 820. At 820, core network device 200 receives a security mode complete message from the UE device based (at least in part) on the nonce of the attach request message matching the nonce of the security mode command message, as described above in relation to instructions 255 of FIG. 2. If, at 815, the nonces do not match, method 800 proceeds to 825. At 825, core network device 200 receives a security mode failure message from the UE device based (at least in part) on the nonce of the attach request message not matching the nonce of the security mode command message, as described above in relation to instructions 260 of FIG. 2.

Although the flowchart of FIG. 8 and its relation to method 700 of FIG. 7 show a specific order of performance of certain functionalities, method 800 may not be limited to that order. For example, the functionalities shown in succession in the flowchart may be performed in a different order, may be executed concurrently or with partial concurrence, or a combination thereof. In some examples, functionalities described herein in relation to FIG. 8 may be provided in combination with functionalities described herein in relation to any of FIGS. 1-7 and 9-10.

FIG. 9 is a flowchart of an example method 900 of deterring location tracking of a UE device. Execution of method 900 is described below with reference to core network device 300 of FIG. 3. Implementation of method 900 is not limited to such examples, however (e.g., core network device 100 of FIG. 1, etc.).

In the example of FIG. 9, method 900 may be a method of core network device 300 of FIG. 3. Method 900 may follow method 700 of FIG. 7. At 905 core network device 300 may receive an attach request message that is integrity protected, as described above in relation to instructions 365 of FIG. 3. At 910, core network device 300 may determine the integrity of the attach request message, as described above in relation to instructions 370 of FIG. 3. If the integrity of the attach request message is intact, method 900 may proceed to 915. At 915, based (at least in part) on a determination that the integrity of the attach request message is intact, core network device 300 may send an attach accept message to the UE device, as described above in relation to instructions 375 of FIG. 3. If the integrity of the attach request message is determined to be compromised at 910, method 900 may proceed to 920. At 920, based (at least in part) on a determination that the integrity of the attach request message is compromised, core network device 300 may send an attach reject message to the UE device, as described above in relation to instructions 380 of FIG. 3. In some examples, core network device 300 may also receive a tracking area update message that is integrity protected, as described above in relation to instructions 385 of FIG. 3.

Although the flowchart of FIG. 9 and its relation to method 700 of FIG. 7 show a specific order of performance of certain functionalities, method 900 may not be limited to that order. For example, the functionalities shown in succession in the flowchart may be performed in a different order, may be executed concurrently or with partial concurrence, or a combination thereof. In some examples, functionalities described herein in relation to FIG. 9 may be provided in combination with functionalities described herein in relation to any of FIGS. 1-8 and 10.

What is claimed is:

1. A core network device of a telecommunication network, the core network device comprising:
    a processing resource; and
    a machine-readable storage medium encoded with instructions executable by the processing resource, the machine-readable storage medium comprising instructions to:
        receive a first service request message from a user equipment (UE) device, wherein the first service request message includes a pseudo-Globally Unique Temporary Identifier (p-GUTI) to deter location tracking of a user equipment (UE) device;
        send a paging message, wherein the paging message includes the p-GUTI; and
        based on the p-GUTI of the first service request message matching the p-GUTI of the paging message, receive a second service request message from the UE device, wherein the second service request message includes a new p-GUTI.

2. The core network device of claim 1, wherein the core network device is a mobility management entity.

3. The core network device of claim 1, wherein the first and second service request messages are encrypted.

4. The core network device of claim 1, wherein the machine-readable storage medium further comprises instructions to:
    receive an attach request message from the UE device, wherein the attach request message includes a nonce;
    send a security mode command message to the UE device, wherein the security mode command message includes the nonce; and
    based on the nonce of the attach request message matching the nonce of the security mode command message, receive a security mode complete message from the UE device.

5. The core network device of claim 4, wherein the machine-readable storage medium further comprises instructions to:
    based on the nonce of the attach request message not matching the nonce of the security mode command message, receive a security mode failure message from the UE device.

6. The core network device of claim 1, wherein the machine-readable storage medium further comprises instructions to:
    receive an attach request message from the UE device, wherein the attach request message is integrity protected.

7. The core network device of claim 6, wherein the machine-readable storage medium further comprises instructions to:
    determine the integrity of the attach request message;
    based on a determination that the integrity of the attach request message is intact, send an attach accept message to the UE device; and
    based on a determination that the integrity of the attach request message is compromised, send an attach reject message to the UE device.

8. The core network device of claim 1, wherein the machine-readable storage medium further comprises instructions to:
    receive a tracking area update message, wherein the tracking area update message is integrity protected.

9. A user equipment (UE) device comprising:
    a processing resource; and
    a machine-readable storage medium encoded with instructions executable by the processing resource, the machine-readable storage medium comprising instructions to:
        send a first service request message to a core network device, wherein the first service request message includes a pseudo-Globally Unique Temporary Identifier (p-GUTI) to deter location tracking of the UE device;
        receive a paging message, wherein the paging message includes the p-GUTI;
        determine whether the p-GUTI of the first service request message matches the p-GUTI of the paging message; and
        based on a determination that the p-GUTI of the first service request message matches the p-GUTI of the paging message, send a second service request message to the core network device, wherein the second service request message includes a new p-GUTI.

10. The UE device of claim 9, wherein the machine-readable storage medium further comprises instructions to:
    based on a determination that the p-GUTI of the first service request message does not match the p-GUTI of the paging message, monitor a paging channel for a next paging message.

11. The UE device of claim 9, wherein the first and second service request messages are encrypted.

12. The UE device of claim 9, wherein the machine-readable storage medium further comprises instructions to:
    send an attach request message to the core network device, wherein the attach request message includes a nonce; and
    receive a security mode command message from the core network device, wherein the security mode command message includes the nonce;
    determine whether the nonce of the attach request message matches the nonce of the security mode command message; and
    based on a determination that the nonce of the attach request message matches the nonce of the security mode command message, send a security mode complete message to the core network device.

13. The UE device of claim 9, wherein the machine-readable storage medium further comprises instructions to:
    send an attach request message to the core network device, wherein the attach request message is integrity protected.

14. The UE device of claim 13, wherein the attach request message is integrity protected via integrity algorithm agreement and integrity key agreement.

15. The UE device of claim 13, wherein the machine-readable storage medium further comprises instructions to:

send a tracking area update message to the core network device, wherein the tracking area update message is integrity protected.

16. The UE device of claim 15, wherein the tracking area update message is integrity protected via an integrity algorithm agreement and an integrity key agreement.

17. A method of deterring location tracking of a user equipment (UE) device, the method comprising:
receiving, at a core network device, a first service request message from the UE device, wherein the first service request message includes a pseudo-Globally Unique Temporary Identifier (p-GUTI) to deter location tracking of the UE device;
sending, by the core network device, a paging message, wherein the paging message includes the p-GUTI; and
receiving, at the core network device, a second service request message from the UE device based on the p-GUTI of the first service request message matching the p-GUTI of the paging message, wherein the second service request message includes a new p-GUTI and wherein each subsequent service request message includes a different p-GUTI.

18. The method of claim 17 further comprising:
receiving, at the core network device, an attach request message from the UE device, wherein the attach request message includes a nonce;
sending, by the core network device, a security mode command message to the UE device, wherein the security mode command message includes the nonce;
based on the nonce of the attach request message matching the nonce of the security mode command message, receiving, at the core network device, a security mode complete message from the UE device; and
based on the nonce of the attach request message not matching the nonce of the security mode command message, receiving, at the core network device, a security mode failure message from the UE device.

19. The method of claim 17 further comprising:
receiving, at the core network device, an attach request message from the UE device, wherein the attach request message is integrity protected;
determining, at the core network device, the integrity of the attach request message;
based on a determination that the integrity of the attach request message is intact, sending, by the core network device, an attach accept message to the UE device; and
based on a determination that the integrity of the attach request message is compromised, sending, by the core network device, an attach reject message to the UE device.

20. The method of claim 19, the method further comprising:
receiving, at the core network device, a tracking area update message, wherein the tracking area update message is integrity protected.

* * * * *